(12) United States Patent
Xia

(10) Patent No.: US 11,729,436 B2
(45) Date of Patent: Aug. 15, 2023

(54) METHOD, APPARATUS, AND SYSTEM FOR DETECTING VIDEO CODE STREAM

(71) Applicant: ZTE Corporation, Shenzhen (CN)

(72) Inventor: Hongsheng Xia, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/634,423

(22) PCT Filed: Aug. 12, 2020

(86) PCT No.: PCT/CN2020/108680
§ 371 (c)(1),
(2) Date: Feb. 10, 2022

(87) PCT Pub. No.: WO2021/027846
PCT Pub. Date: Feb. 18, 2021

(65) Prior Publication Data
US 2022/0329884 A1   Oct. 13, 2022

(30) Foreign Application Priority Data

Aug. 12, 2019   (CN) .......................... 201910739010.X

(51) Int. Cl.
*H04N 21/234*   (2011.01)
*H04N 21/6437*   (2011.01)
*H04N 21/647*   (2011.01)

(52) U.S. Cl.
CPC ... *H04N 21/23418* (2013.01); *H04N 21/6437* (2013.01); *H04N 21/64784* (2013.01)

(58) Field of Classification Search
CPC ......... H04N 21/23418; H04N 21/6437; H04N 21/64784
See application file for complete search history.

(56) References Cited

U.S. PATENT DOCUMENTS

2003/0005144 A1   1/2003 Engel et al.
2009/0316894 A1   12/2009 Li
(Continued)

FOREIGN PATENT DOCUMENTS

CN   1719909 A   1/2006
CN   102012846 A   4/2011
(Continued)

OTHER PUBLICATIONS

International Searching Authority. International Search Report and Written Opinion for PCT Application No. PCT/CN2020/108680 and English translation, dated Nov. 18, 2020, pp. 1-9.
(Continued)

*Primary Examiner* — Joshua D Taylor
(74) *Attorney, Agent, or Firm* — Vivacqua Crane, PLLC

(57) ABSTRACT

A method, apparatus, and system for detecting a video bitstream, and a non-transitory computer-readable storage medium are disclosed. The method may include: receiving a first feature value generated by a source node which transmits a video bitstream, where the first feature value is feature information of the video bitstream generated by the source node according to a preset rule; receiving a second feature value generated by another node which transmits the video bitstream, where the second feature value is feature information of the video bitstream generated by the another node according to the preset rule; determining whether the first feature value is consistent with the second feature value via comparison; and generating an alarm in response to a comparison result that the first feature value is inconsistent with the second feature value.

10 Claims, 7 Drawing Sheets

(56) References Cited

U.S. PATENT DOCUMENTS

| | | | |
|---|---|---|---|
| 2012/0148089 A1 | 6/2012 | Vashistha et al. | |
| 2012/0230186 A1* | 9/2012 | Lee | H04L 43/0882 370/432 |
| 2013/0259228 A1 | 10/2013 | Ren et al. | |
| 2014/0010366 A1 | 1/2014 | Quinn et al. | |
| 2015/0208245 A1* | 7/2015 | Robinton | H04L 9/3247 455/411 |
| 2015/0304188 A1 | 10/2015 | Chun | |
| 2018/0288126 A1 | 10/2018 | Smart et al. | |

FOREIGN PATENT DOCUMENTS

| | | |
|---|---|---|
| CN | 103079054 A | 5/2013 |
| CN | 104036157 A | 9/2014 |
| CN | 107370712 A | 11/2017 |
| CN | 108777688 A | 11/2018 |
| WO | 2016082485 A1 | 6/2016 |
| WO | 2017193949 A1 | 11/2017 |
| WO | WO-2017193949 A1 * | 11/2017 |

OTHER PUBLICATIONS

Lu, Hao. "Design and Exploration of the Online Detection System of Website Defacements Based on Cloud Architecture," Software Industry and Engineering, 2018, pp. 27-30.

The State Intellectual Property Office of People's Republic of China. First Office Action for CN Application No. 201910739010.X and English translation, dated Aug. 16, 2022, pp. 1-7.

The State Intellectual Property Office of People's Republic of China First Search Report for CN Application No. 201910739010.X and English translation, dated Aug. 8, 2022, pp. 1-7.

Yao, et al. "Detection and Localization of Digital Video Regional Tampering," Journal of Image and Graphics, 2015, pp. 779-791.

European Patent Office. Extended European Search Report for EP Application No. 20851984.3, dated Sep. 29, 2022, pp. 1-9.

* cited by examiner

METHOD, APPARATUS, AND SYSTEM FOR DETECTING VIDEO CODE STREAM

CROSS-REFERENCE TO RELATED APPLICATION

This application is a national stage filing under 35 U.S.C. § 371 of international application number PCT/CN2020/108680, filed Aug. 12, 2020, which claims priority to Chinese patent application No. 201910739010.X filed on Aug. 12, 2019. The contents of these applications are incorporated herein by reference in their entirety.

TECHNICAL FIELD

Embodiments of the present disclosure relate to, but are not limited to, the field of Content Delivery Network (CDN) videos, such as a method, an apparatus, and a system for detecting a video bitstream.

BACKGROUND

With the rapid development of streaming media CDNs, video services of the CDNs are gradually popularized. As a result, problems in network security also arise. A lot of information related to pornography and violence may replace normal bitstreams to be spread to users, causing adverse effects. It is necessary to find a tampered bitstream in the network and generate an alarm as soon as possible.

In existing technology, the following practice is performed to resolve security problems of CDN bitstreams: perform encrypted transmission on a transmitted bitstream, that is, a Digital Rights Management (DRM) technique is used. This scheme can better guarantee security of a bitstream, but an implementation cost of this scheme is relatively high because an encryption and decryption server and a related key management system are required. In addition, existing encryption systems are monopolized by some manufacturers, and expenses is high to purchase licenses.

SUMMARY

An embodiment of the present disclosure provides a method for detecting a video bitstream, which may include: receiving a first feature value generated by a source node which transmits a video bitstream, where the first feature value is feature information of the video bitstream generated by the source node according to a preset rule; receiving a second feature value generated by another node which transmits the video bitstream, where the second feature value is feature information of the video bitstream generated by the another node according to the preset rule; determining whether the first feature value is consistent with the second feature value via comparison; and generating an alarm in response to a comparison result that the first feature value is inconsistent with the second feature value.

An embodiment of the present disclosure provides an apparatus for detecting a video bitstream, which may include: a first receiving unit, configured to receive a first feature value generated by a source node which transmits a video bitstream, where the first feature value is feature information of the video bitstream generated by the source node according to a preset rule; a second receiving unit, configured to receive a second feature value generated by another node which transmits the video bitstream, where the second feature value is feature information of the video bitstream generated by the another node according to the preset rule; a comparison unit, configured to determine whether the first feature value is consistent with the second feature value via comparison; and an alarm unit, configured to generate an alarm in response to a comparison result that the first feature value is inconsistent with the second feature value.

An embodiment of the present disclosure provides a system for detecting a video bitstream, which may include: a File Transfer Protocol (FTP) server and a comparison server, where the FTP server is configured to: receive a first feature value generated and sent by a source node which transmits a video bitstream, where the first feature value is feature information of the video bitstream generated by the source node according to a preset rule; and send the first feature value to the comparison server; the FTP server is further configured to: receive a second feature value generated and sent by another node which transmits the video bitstream, where the second feature value is feature information of the video bitstream generated by the another node according to the preset rule; and send the second feature value to the comparison server; and the comparison server is configured to: determine whether the first feature value is consistent with the second feature value via comparison; and generate an alarm in response to a comparison result that the first feature value is inconsistent with the second feature value.

An embodiment of the present disclosure provides an apparatus for detecting a video bitstream, which may include a memory, a processor, and a computer program stored in the memory and executable by the processor, where the computer program, when executed by the processor, implements the foregoing method for detecting a video bitstream.

An embodiment of the present disclosure provides a non-transitory computer-readable storage medium, where the non-transitory computer-readable storage medium stores an information processing program, and the information processing program, when executed by a processor, implements the foregoing method for detecting a video bitstream.

DETAILED DESCRIPTION

Several embodiments of the present disclosure are described in detail below with reference to the accompanying drawings. It should be noted that, in the case of no conflict, the embodiments of the present disclosure and features in the embodiments may be arbitrarily combined with each other.

The steps shown in the flowcharts of the drawings may be performed in a computer system, such as with a set of computer-executable instructions. Moreover, although a logical order is shown in the flowcharts, in some cases, the steps shown or described may be performed in an order different from that shown or described herein.

Figure 1:
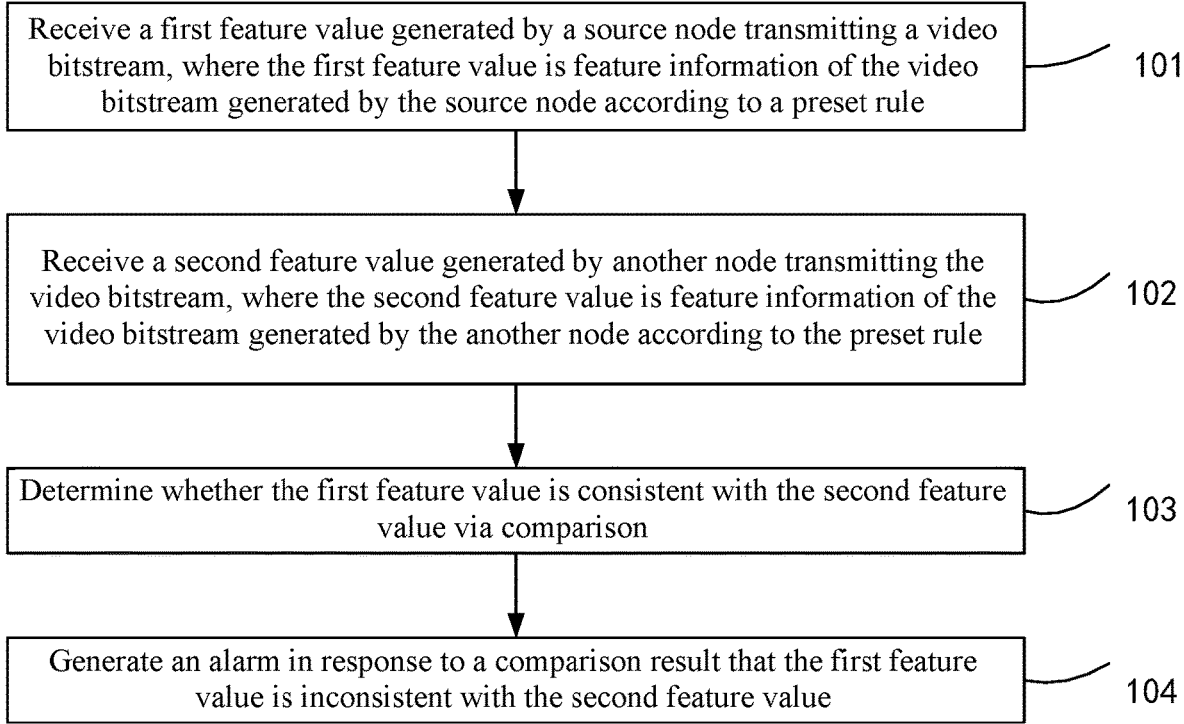
FIG. 1 is a flowchart of a method for detecting a video bitstream according to an embodiment of the present disclosure.

FIG. 1 is a flowchart of a method for detecting a video bitstream according to an embodiment of the present disclosure. As shown in FIG. 1, the method includes steps 101 to 104.

At step 101, a first feature value generated by a source node which transmits a video bitstream is received, where the first feature value is feature information of the video bitstream generated by the source node according to a preset rule.

At step 102, a second feature value generated by another node which transmits the video bitstream is received, where the second feature value is feature information of the video bitstream generated by the another node according to the preset rule.

At step 103, whether the first feature value is consistent with the second feature value is determined via comparison.

At step 104, an alarm is generated in response to a comparison result that the first feature value is inconsistent with the second feature value.

The source node or the another node generates the feature information of the video bitstream according to the preset rule includes: generating the feature information of the video bitstream according to a Real-time Transport Protocol (RTP) packet of I-frame data of the video bitstream.

The feature information of the video bitstream includes: an identifier of the bitstream, an RTP packet identifier of the I-frame data, and information about the RTP packet.

Generating the feature information of the video bitstream according to an RTP packet of I-frame data of the video bitstream includes: selecting a plurality of RTP packets of the I-frame data of the video bitstream, generating a Message-Digest algorithm 5 (MD5) value of an actual load of each selected RTP packet, and performing XOR operation on a plurality of generated MD5 values, to obtain the feature information of the video bitstream.

Selecting a plurality of RTP packets of the I-frame data of the video bitstream includes: selecting the RTP packets which comprises at least one packet in ascending order of (N*20+1) and a tail packet, where N is an integer equal to or greater than 0, for example, selecting the RTP packets in an order of 1, 21, 41, . . . , and a tail packet, where when the tail packet being a head packet of the at least one packet, an MD5 value is only generated once for the head packet or the tail packet;

when the tail packet is exactly the $(N*20+1)_{th}$ RTP packet, where N is an integer greater than 0, an MD5 value is not generated separately for the tail packet.

The method further includes: skipping generating an alarm in response to a comparison result that the first feature value is consistent with the second feature value.

Figure 2:
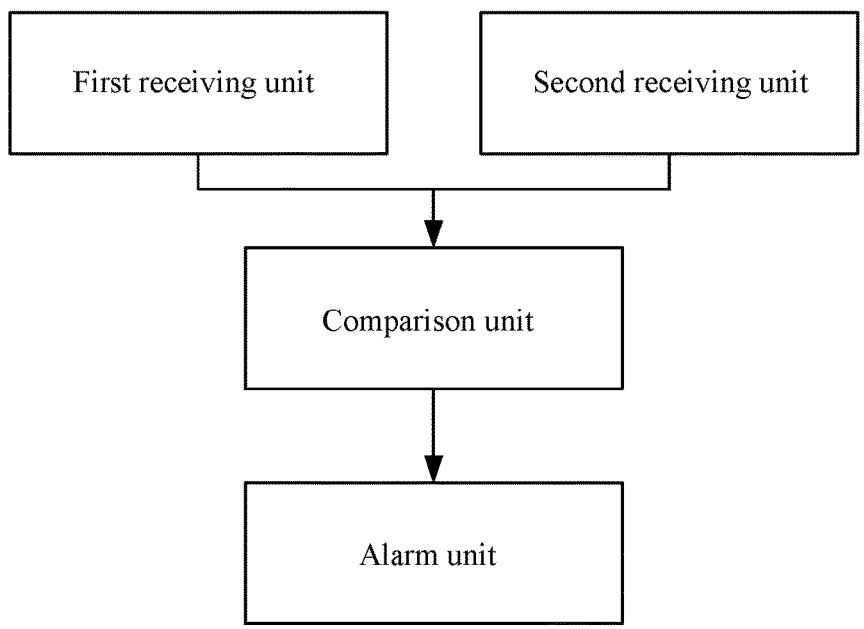
FIG. 2 is a schematic structural diagram of an apparatus for detecting a video bitstream according to an embodiment of the present disclosure.

FIG. 2 is a schematic structural diagram of an apparatus for detecting a video bitstream according to an embodiment of the present disclosure. As shown in FIG. 2, the apparatus includes a first receiving unit, a second receiving unit, a comparison unit, and an alarm unit.

The first receiving unit is configured to receive a first feature value generated by a source node which transmits a video bitstream, where the first feature value is feature information of the video bitstream generated by the source node according to a preset rule.

The second receiving unit is configured to receive a second feature value generated by another node which transmits the video bitstream, where the second feature value is feature information of the video bitstream generated by the another node according to the preset rule.

The comparison unit is configured to determine whether the first feature value is consistent with the second feature value via comparison.

The alarm unit is configured to generate an alarm in response to a comparison result that the first feature value is inconsistent with the second feature value.

The source node or the another node generates the feature information of the video bitstream according to the preset rule includes: generating the feature information of the video bitstream according to an RTP packet of I-frame data of the video bitstream.

The feature information of the video bitstream includes: an identifier of the bitstream, an RTP packet identifier of the I-frame data, and information about the RTP packet.

Generating the feature information of the video bitstream according to an RTP packet of I-frame data of the video bitstream includes: selecting a plurality of RTP packets of the I-frame data of the video bitstream, generating an MD5 value of an actual load of each selected RTP packet, and performing XOR operation on a plurality of generated MD5 values, to obtain the feature information of the video bitstream.

Selecting a plurality of RTP packets of the I-frame data of the video bitstream includes: selecting the RTP packets which comprises at least one packet in ascending order of (N*20+1) and a tail packet, where N is an integer equal to or greater than 0, for example, selecting the RTP packets in an order of 1, 21, 41, . . . , and a tail packet, where when the tail packet being a head packet of the at least one packet, an MD5 value is only generated once for the head packet or the tail packet;

when the tail packet is exactly the $(N*20+1)_{th}$ RTP packet, where N is an integer greater than 0, an MD5 value is not generated separately for the tail packet.

The alarm unit is further configured to skip generating an alarm in response to a comparison result that the first feature value is consistent with the second feature value.

The apparatus may be disposed in a separate server, for example, a comparison server.

Figure 3:
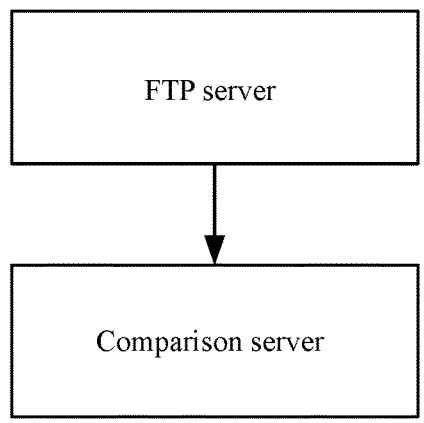
FIG. 3 is a schematic structural diagram of a system for detecting a video bitstream according to an embodiment of the present disclosure.

FIG. 3 is a schematic structural diagram of a system for detecting a video bitstream according to an embodiment of the present disclosure. As shown in FIG. 3, the system includes: an FTP server and a comparison server.

The FTP server is configured to: receive a first feature value generated and sent by a source node which transmits a video bitstream, where the first feature value is feature information of the video bitstream generated by the source node according to a preset rule; and send the first feature value to the comparison server.

The FTP server is further configured to: receive a second feature value generated and sent by another node which transmits the video bitstream, where the second feature value is feature information of the video bitstream generated by the another node according to the preset rule; and send the second feature value to the comparison server.

The comparison server is configured to: determine whether the first feature value is consistent with the second feature value via comparison; and generate an alarm in response to a comparison result that the first feature value is inconsistent with the second feature value.

The source node or the another node generates the feature information of the video bitstream according to the preset rule includes: generating the feature information of the video bitstream according to an RTP packet of I-frame data of the video bitstream.

The feature information of the video bitstream includes: an identifier of the bitstream, an RTP packet identifier of the I-frame data, and information about the RTP packet.

Generating the feature information of the video bitstream according to an RTP packet of I-frame data of the video bitstream includes: selecting a plurality of RTP packets of the I-frame data of the video bitstream, generating an MD5 value of an actual load of each selected RTP packet, and performing XOR operation on a plurality of generated MD5 values, to obtain the feature information of the video bitstream.

Selecting a plurality of RTP packets of the I-frame data of the video bitstream includes: selecting the RTP packets which comprises at least one packet in ascending order of (N*20+1) and a tail packet, where N is an integer equal to or greater than 0, for example, selecting the RTP packets in an order of 1, 21, 41, . . . , and a tail packet, where when the tail packet being a head packet of the at least one packet, an MD5 value is only generated once for the head packet or the tail packet;

when the tail packet is exactly the $(N*20+1)_{th}$ RTP packet, where N is an integer greater than 0, an MD5 value is not generated separately for the tail packet.

The comparison server is further configured to skip generating an alarm in response to a comparison result that the first feature value is consistent with the second feature value.

Figure 4:
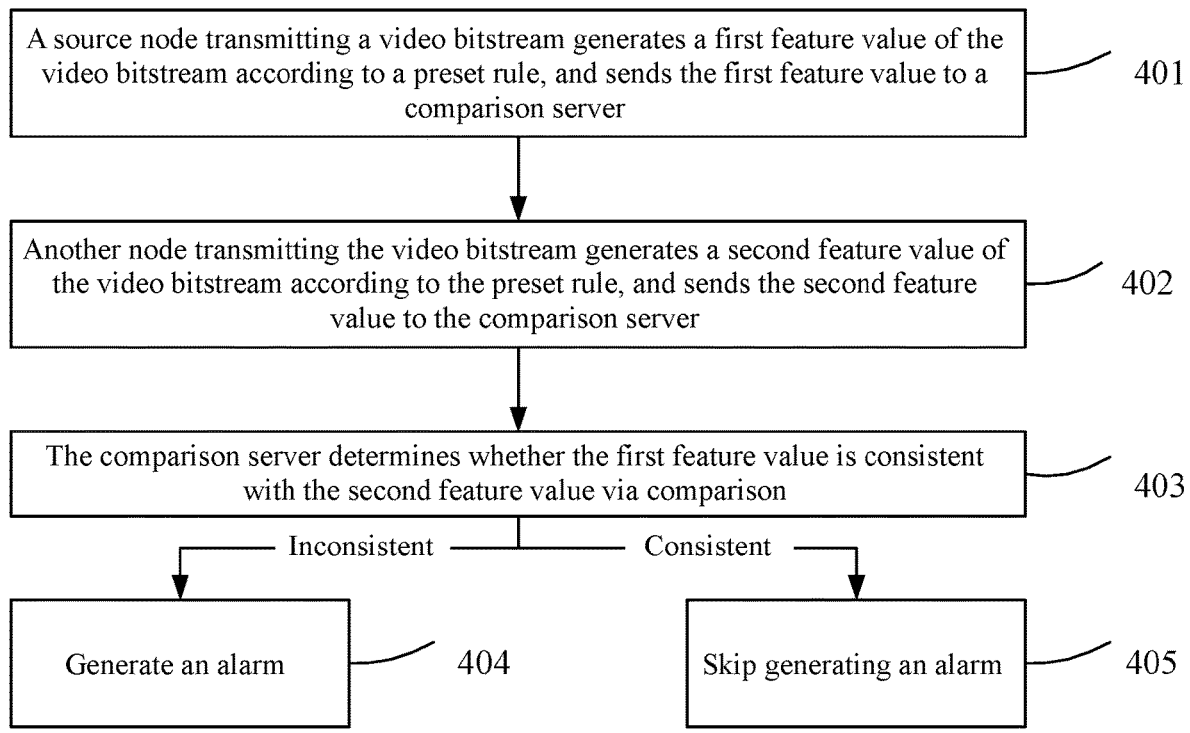
FIG. 4 is a flowchart of another method for detecting a video bitstream according to an embodiment of the present disclosure.

FIG. 4 is a flowchart of another method for detecting a video bitstream according to an embodiment of the present disclosure. As shown in FIG. 4, the method includes steps 401 to 405.

At step 401, a source node which transmits a video bitstream generates a first feature value of the video bitstream according to a preset rule, and sends the first feature value to a comparison server.

The source node may generate feature information, namely, the first feature value, according to an RTP packet of I-frame data of the video bitstream.

The feature information includes at least one selected from: an identifier of the bitstream, an RTP packet identifier of the I-frame data, and information about the RTP packet. The information about the RTP packet refers to an MD5 value of an actual load of each RTP packet.

For example, a plurality of RTP packets of the I-frame data of the video bitstream are selected; an MD5 value of an actual load of each selected RTP packet is generated; and XOR operation is performed on a plurality of generated MD5 values, to obtain the feature information of the video bitstream.

There may be a plurality of RTP packets in one I-frame. Not all of these RTP packets are required to generate a check code (namely, an MD5 value). For example, these RTP packets may be generated in an order of 1, 21, 41, . . . , and a tail packet, namely, an order of a head packet, one packet extracted from every 20 packets, and the tail packet. When the head packet and the tail packet are identical, an MD5 value is only generated once; and when the tail packet is exactly the $(N*20+1)_{th}$ RTP packet, where N is an integer greater than 0, an MD5 value is not generated separately for the tail packet. The check code is an MD5 value of an actual load of a generated RTP packet. Then, XOR operation is performed on a plurality of check codes, to generate the feature information of the video bitstream.

At step 402, another node which transmits the video bitstream generates a second feature value of the video bitstream according to the preset rule, and sends the second feature value to the comparison server.

The another node and the source node generate the feature values according to the same rule.

The another node and the source node may send the feature values to the comparison server via files or messages.

At step 403, the comparison server determines whether the first feature value is consistent with the second feature value via comparison.

The comparison server may obtain the feature information of the video bitstream, that is, the feature values, via file or message transmission.

For example, corresponding feature information may be obtained according to the identifier of the bitstream and the RTP packet identifier that are in the feature information.

Step 404 is performed in response to a comparison result that the first feature value is inconsistent with the second feature value; or step 405 is performed in response to a comparison result that the first feature value is consistent with the second feature value.

At step 404, an alarm is generated.

At step 405, no alarm is generated.

When the first feature value is inconsistent with the second feature value, it is considered that the bitstream is changed. For example, the bitstream is tampered or is replaced by another bitstream. When the first feature value is consistent with the second feature value, it is considered that the bitstream is not changed.

According to the technical scheme provided by this embodiment of the present disclosure, a tampered bitstream can be found in time, and an alarm can be generated.

Figure 5:
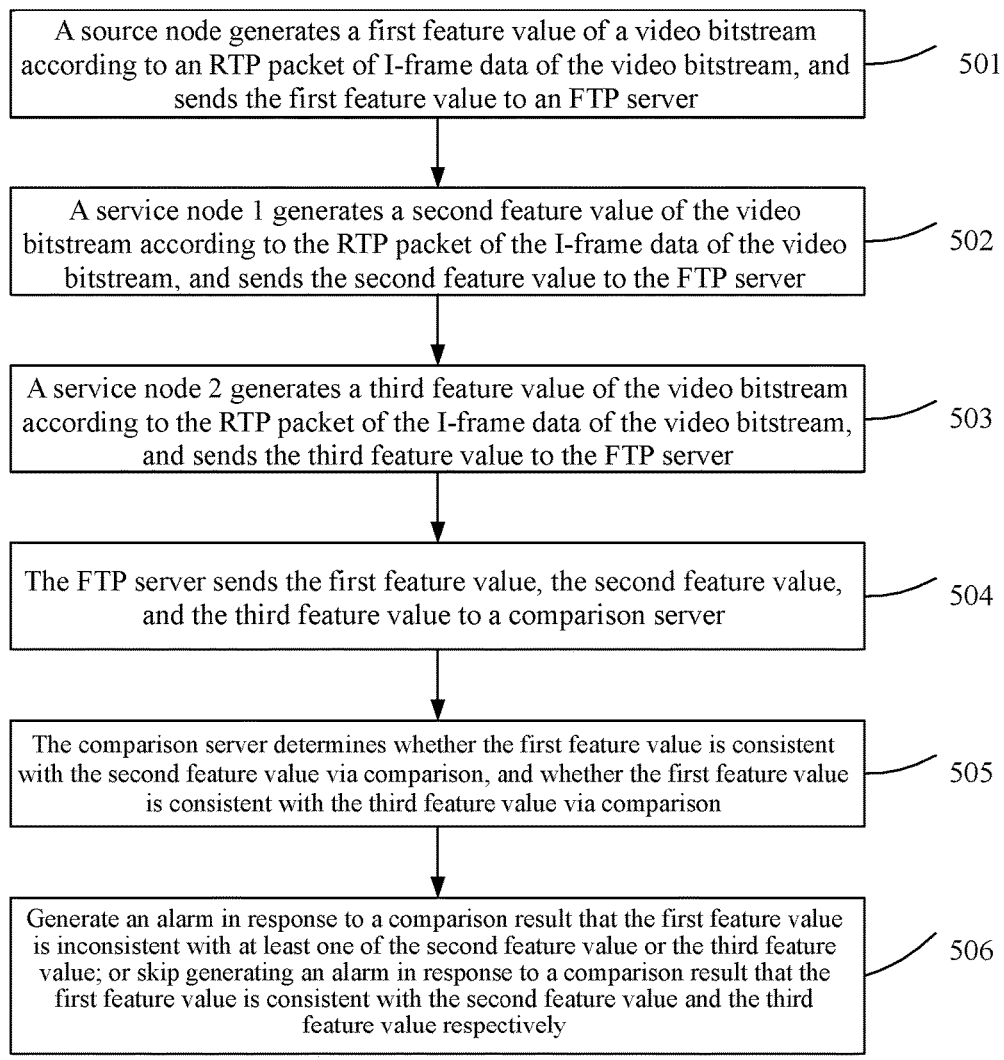
FIG. 5 is a flowchart of still another method for detecting a video bitstream according to an embodiment of the present disclosure.

FIG. 5 is a flowchart of still another method for detecting a video bitstream according to an embodiment of the present disclosure.

Figure 6:
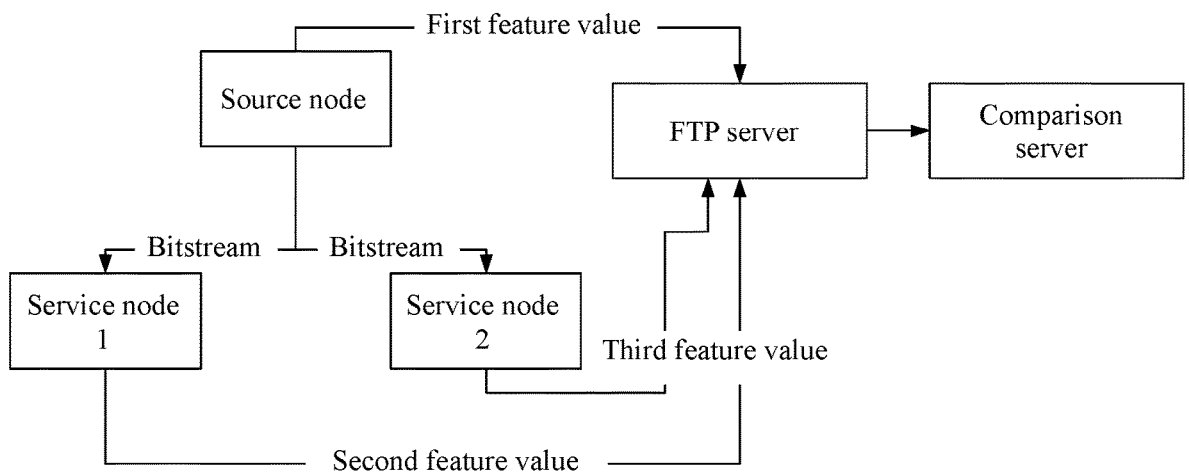
FIG. 6 is a schematic architectural diagram of a system for detecting a video bitstream according to an embodiment of the present disclosure.

This embodiment is applied to a system shown in FIG. 6. As shown in FIG. 6, a node generating a source bitstream feature value may be deployed at a source node of a CDN network, namely, a first node receiving a bitstream. A node generating a detection bitstream feature value is deployed at another service node (namely, the another node in the embodiments of the present disclosure), that is, a bitstream detection point and a service node are co-deployed. The another service node is an internal node of the CDN network, such as a regional node and an edge node. There may be at least one service node at which the node generating a detection bitstream feature value (namely, the second feature value) is deployed. This embodiment is described by taking an example in which nodes generating a detection bitstream feature value are deployed at two service nodes 1 and 2.

An FTP server is also deployed, and is configured to: receive bitstream feature values uploaded by the source node and the another service node, and provide the values to a comparison server at the same time. Alternatively, a comparison server may be separately deployed, and configured to: receive bitstream feature values that are of a video bitstream and uploaded by the FTP server, and determine whether the values are consistent via comparison. An alarm is generated when it is determined that the values are inconsistent.

As shown in FIG. 5, the method includes steps 501 to 506.

At step 501, a source node generates a first feature value of a video bitstream according to an RTP packet of I-frame data of the video bitstream, and sends the first feature value to the FTP server.

At step 502, a service node 1 generates a second feature value of the video bitstream according to the RTP packet of the I-frame data of the video bitstream, and sends the second feature value to the FTP server.

At step 503, a service node 2 generates a third feature value of the video bitstream according to the RTP packet of the I-frame data of the video bitstream, and sends the third feature value to the FTP server.

An order to perform steps 502 and 503 is not fixed.

At step 504, the FTP server sends the first feature value, the second feature value, and the third feature value to a comparison server.

At step 505, the comparison server determines whether the first feature value is consistent with the second feature value via comparison, and whether the first feature value is consistent with the third feature value via comparison.

At step 506, an alarm is generated in response to a comparison result that the first feature value is inconsistent with at least one of the second feature value or the third feature value; or no alarm is generated in response to a comparison result that the first feature value is consistent with the second feature value and the third feature value respectively.

When the first feature value is inconsistent with at least one of the second feature value or the third feature value, it is considered that the video bitstream is changed. Therefore, an alarm may be generated on a user interface.

A comparison module and an alarm module may be deployed in the comparison server. The comparison module is configured to: determine whether the first feature value is consistent with the second feature value via comparison, and whether the first feature value is consistent with the third feature value via comparison; and instruct the alarm module to generate an alarm in response to the comparison result that the first feature value is inconsistent with at least one of the second feature value or the third feature value. A user interface may also be disposed. Alarm information is displayed on the user interface. Alternatively, the alarm information may be directly sent to an administrator.

According to the technical scheme provided by this embodiment, a tampered bitstream can be found in time, and an alarm can be generated. In addition, a video bitstream detection point and a service node are co-deployed, so that the cost is low.

Figure 7:
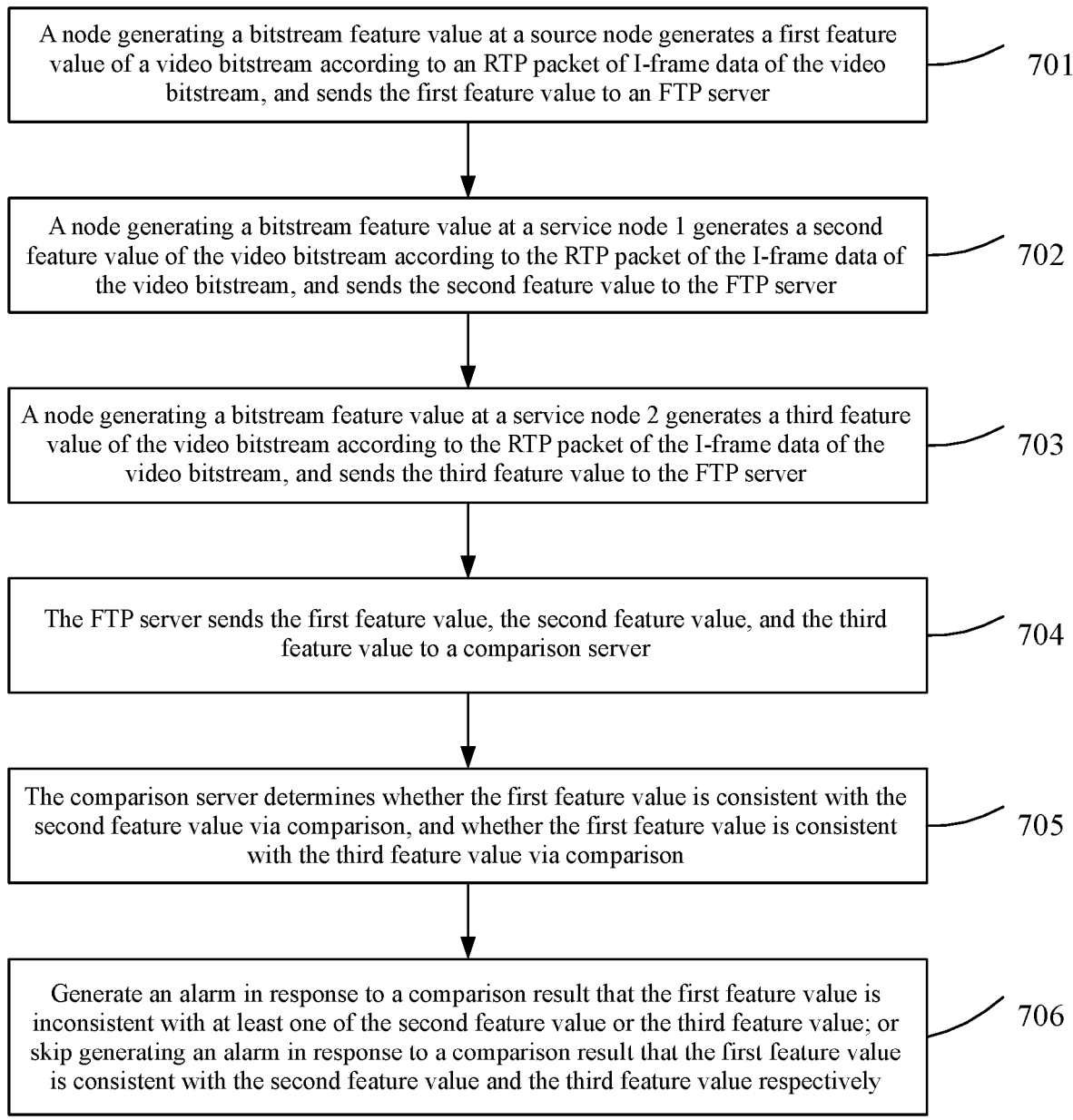
FIG. 7 is a flowchart of yet another method for detecting a video bitstream according to an embodiment of the present disclosure.

FIG. 7 is a flowchart of yet another method for detecting a video bitstream according to an embodiment of the present disclosure.

Figure 8:
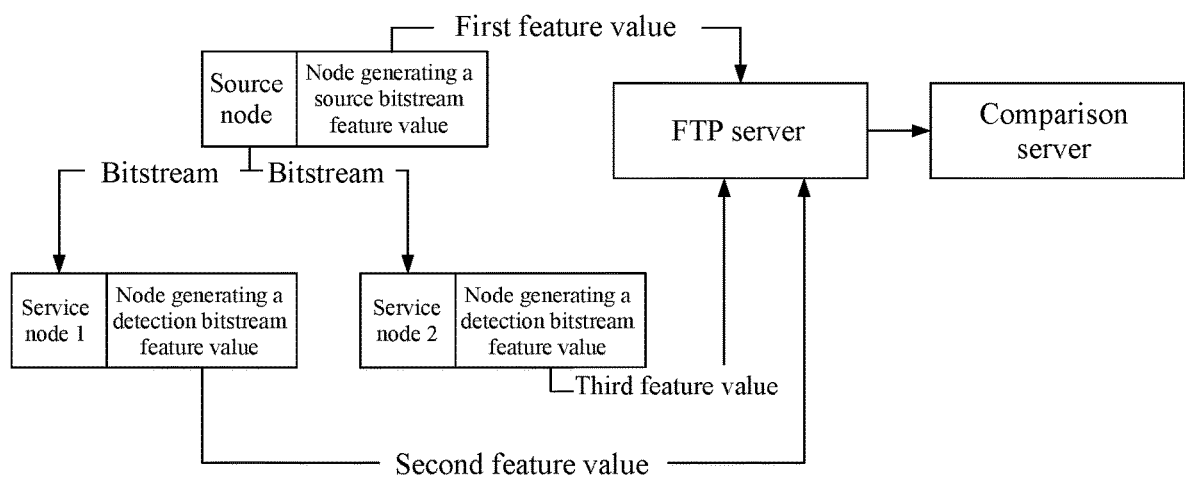
FIG. 8 is a schematic architectural diagram of another system for detecting a video bitstream according to an embodiment of the present disclosure.

This embodiment is applied to a system shown in FIG. 8. As shown in FIG. 8, a node generating a source bitstream feature value is deployed at a source node of a CDN network, namely, a first node receiving a bitstream, and a node generating a detection bitstream feature value is deployed at another service node which transmits the bitstream. In other words, a service node and a bitstream detection point are separately deployed physically, but are still one node logically.

The another service node is an internal node of the CDN network, such as a regional node and an edge node. There may be at least one service node at which the node generating a detection bitstream feature value is deployed. This embodiment is described by taking an example in which nodes generating a detection bitstream feature value are deployed at two service nodes 1 and 2.

An FTP server is also deployed, and is configured to: receive bitstream feature values uploaded by the source node and the another service node, and provide the values to a comparison server at the same time. Alternatively, a comparison server may be separately deployed, and configured to: receive bitstream feature values that are of a video bitstream and uploaded by the FTP server, and determine whether the values are consistent via comparison. An alarm is generated when it is determined that the values are inconsistent.

As shown in FIG. 7, the method includes steps 701 to 706.

At step 701, a node generating a bitstream feature value at a source node generates a first feature value of a video bitstream according to an RTP packet of I-frame data of the video bitstream, and sends the first feature value to the FTP server.

At step 702, a node generating a bitstream feature value at a service node 1 generates a second feature value of the video bitstream according to the RTP packet of the I-frame data of the video bitstream, and sends the second feature value to the FTP server.

At step 703, a node generating a bitstream feature value at a service node 2 generates a third feature value of the video bitstream according to the RTP packet of the I-frame data of the video bitstream, and sends the third feature value to the FTP server.

An order to perform steps 702 and 703 is not fixed.

At step 704, the FTP server sends the first feature value, the second feature value, and the third feature value to a comparison server.

At step 705, the comparison server determines whether the first feature value is consistent with the second feature value via comparison, and whether the first feature value is consistent with the third feature value via comparison.

At step 706, an alarm is generated in response to a comparison result that the first feature value is inconsistent with at least one of the second feature value or the third feature value; or no alarm is generated in response to a comparison result that the first feature value is consistent with the second feature value and the third feature value respectively.

When the first feature value is inconsistent with at least one of the second feature value or the third feature value, it is considered that the video bitstream is changed. Therefore, an alarm may be generated on a user interface.

A comparison module and an alarm module may be deployed in the comparison server. The comparison module is configured to: determine whether the first feature value is consistent with the second feature value via comparison, and whether the first feature value is consistent with the third feature value via comparison; and instruct the alarm module to generate an alarm in response to the comparison result that the first feature value is inconsistent with at least one of the second feature value or the third feature value.

According to the technical scheme provided by this embodiment, a tampered bitstream can be found in time, and an alarm can be generated. In addition, a video bitstream detection point and a service node are co-deployed, so that the cost is low.

Figure 9:
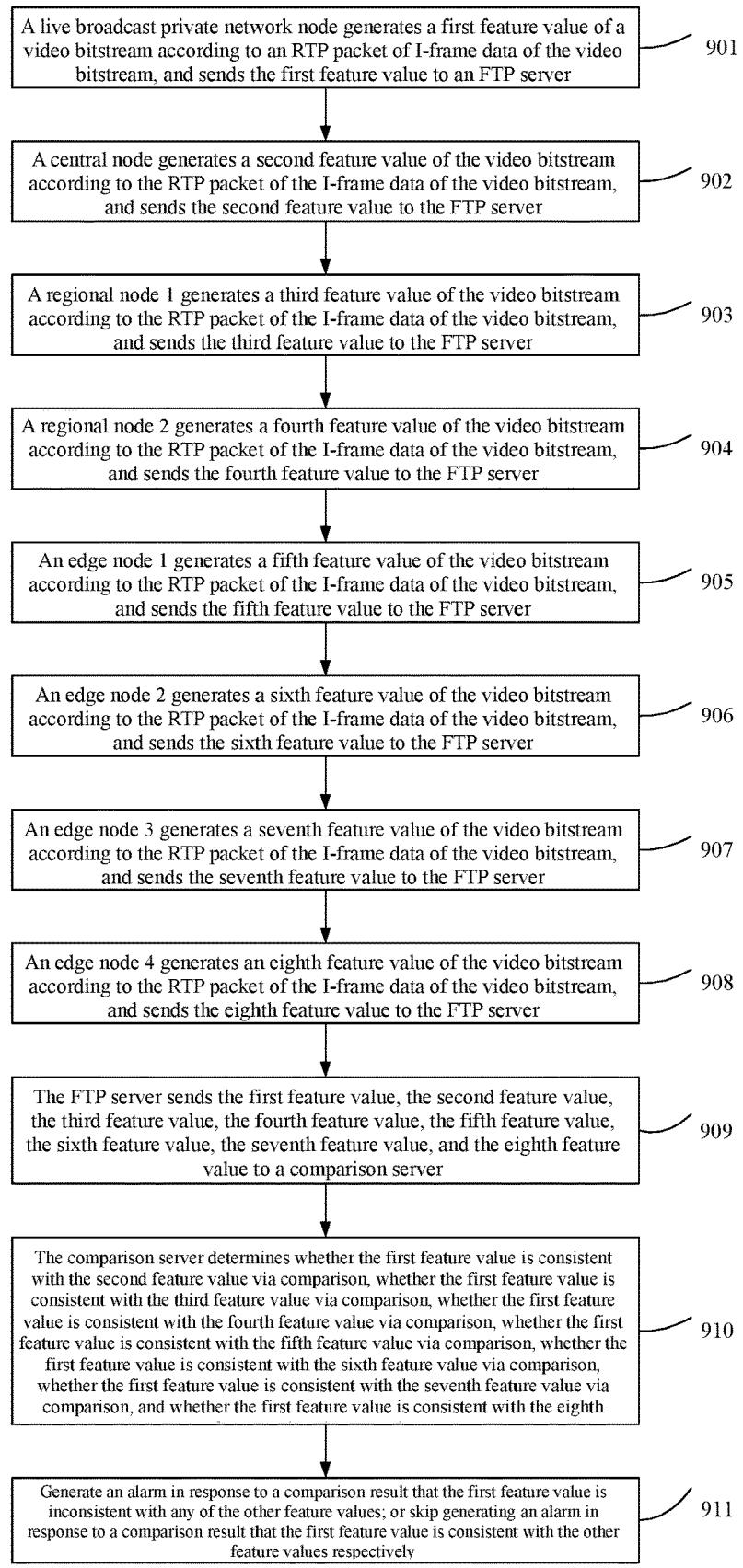
FIG. 9 is a flowchart of still yet another method for detecting a video bitstream according to an embodiment of the present disclosure.

FIG. 9 is a flowchart of yet another method for detecting a video bitstream according to an embodiment of the present disclosure.

Figure 10:
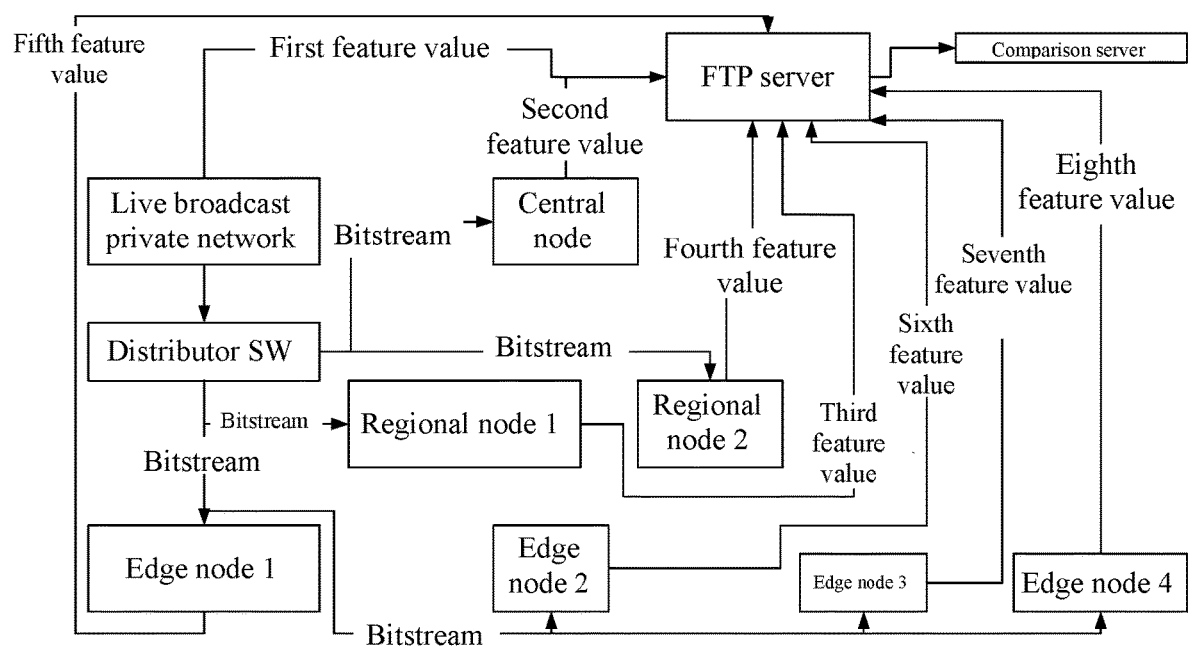
FIG. 10 is a schematic architecture diagram of still another system for detecting a video bitstream according to an embodiment of the present disclosure.

This embodiment is applied to a system shown in FIG. 10. As shown in FIG. 10, there is a CDN network whose nodes consist of a live broadcast private network node and three levels of service nodes. The three levels of service nodes are a central node, regional nodes, and edge nodes.

The live broadcast private network node is used as a starting point introducing a bitstream into the CDN network, and is used as a source node which transmits a video bitstream, to deploy a node generating a source bitstream feature value (namely, a first feature value). All other service nodes are used as detection points, to deploy nodes generating a detection bitstream feature value.

An FTP server is also deployed, and is configured to: receive source bitstream feature values and detection bitstream feature values uploaded by the live broadcast private network node and the other service nodes, and provide the values to a comparison server at the same time.

Alternatively, a comparison server may be separately deployed, and configured to: receive source bitstream feature values and detection bitstream feature values that are of a video bitstream and uploaded by the FTP server, and determine whether the values are consistent via comparison. An alarm is generated when it is determined that the values are inconsistent.

As shown in FIG. 9, the method includes steps 901 to 911.

At step 901, the live broadcast private network node generates a first feature value of a video bitstream according to an RTP packet of I-frame data of the video bitstream, and sends the first feature value to the FTP server.

At step 902, the central node generates a second feature value of the video bitstream according to the RTP packet of the I-frame data of the video bitstream, and sends the second feature value to the FTP server.

At step 903, a regional node 1 generates a third feature value of the video bitstream according to the RTP packet of the I-frame data of the video bitstream, and sends the third feature value to the FTP server.

At step 904, a regional node 2 generates a fourth feature value of the video bitstream according to the RTP packet of the I-frame data of the video bitstream, and sends the fourth feature value to the FTP server.

At step 905, an edge node 1 generates a fifth feature value of the video bitstream according to the RTP packet of the I-frame data of the video bitstream, and sends the fifth feature value to the FTP server.

At step 906, an edge node 2 generates a sixth feature value of the video bitstream according to the RTP packet of the I-frame data of the video bitstream, and sends the sixth feature value to the FTP server.

At step 907, an edge node 3 generates a seventh feature value of the video bitstream according to the RTP packet of the I-frame data of the video bitstream, and sends the seventh feature value to the FTP server.

At step 908, an edge node 4 generates an eighth feature value of the video bitstream according to the RTP packet of the I-frame data of the video bitstream, and sends the eighth feature value to the FTP server.

An order to perform steps 902 to 908 is not fixed.

Each of the foregoing feature values carries an identifier of the bitstream, an RTP packet identifier of the I-frame data, and information about the RTP packet. File description information uploaded to the FTP server may further carry service node identifiers. The service node identifiers are used to distinguish between feature values sent by different service nodes.

At step 909, the FTP server sends the first feature value, the second feature value, the third feature value, the fourth feature value, the fifth feature value, the sixth feature value, the seventh feature value, and the eighth feature value to the comparison server.

At step 910, the comparison server determines whether the first feature value is consistent with the second feature value via comparison, whether the first feature value is consistent with the third feature value via comparison, whether the first feature value is consistent with the fourth feature value via comparison, whether the first feature value is consistent with the fifth feature value via comparison, whether the first feature value is consistent with the sixth feature value via comparison, whether the first feature value is consistent with the seventh feature value via comparison, and whether the first feature value is consistent with the eighth feature value via comparison.

At step 911, an alarm is generated in response to a comparison result that the first feature value is inconsistent with any of the other feature values; or no alarm is generated in response to a comparison result that the first feature value is consistent with each of the other feature values.

When the first feature value is inconsistent with any of the other feature values, it is considered that the video bitstream is changed. Therefore, an alarm may be generated on a user interface. The other feature values include the second feature value, the third feature value, the fourth feature value, the fifth feature value, the sixth feature value, the seventh feature value, and the eighth feature value.

A comparison module and an alarm module may be deployed in the comparison server. The comparison module is configured to: determine whether the first feature value is consistent with the other feature values via comparison; and instruct the alarm module to generate an alarm in response to a comparison result that the first feature value is inconsistent with any of the other feature values.

According to the technical scheme provided by this embodiment, a tampered bitstream can be found in time, and an alarm can be generated. In addition, a video bitstream detection point and a service node may be co-deployed or deployed separately.

According to the technical scheme provided by this embodiment of the present disclosure, in a process of bitstream transmission, a bitstream that is changed can be detected quickly when the bitstream is tampered or is replaced by another bitstream, and an alarm can be generated. Therefore, operation and maintenance personnel can quickly take measures to prevent diffusion of the tampered bitstream and ensure bitstream security.

An embodiment of the present disclosure provides an apparatus for detecting a video bitstream, including a memory, a processor, and a computer program stored in the memory and executable by the processor, where the computer program, when executed by the processor, implements any of the foregoing methods for detecting a video bitstream.

An embodiment of the present disclosure provides a non-transitory computer-readable storage medium, where the non-transitory computer-readable storage medium stores an information processing program, and the information processing program, when executed by a processor, implements any of the foregoing methods for detecting a video bitstream.

It can be understood by those having ordinary skills in the art that all or some of the steps of the methods, systems and functional modules/units in the devices disclosed above can be implemented as software, firmware, hardware and appropriate combinations thereof. In the hardware implementation, the division between functional modules/units mentioned in the above description does not necessarily correspond to the division of physical components; for example, a physical component may have a plurality of functions, or a function or step may be performed cooperatively by a plurality of physical components. Some or all of the components may be implemented as software executed by a processor, such as a digital signal processor or a microprocessor, or as hardware, or as an integrated circuit, such as an application-specific integrated circuit. Such software can be distributed on computer-readable media, which may include computer storage media (or non-transitory media) and communication media (or transitory media). As well known to those of ordinary skills in the art, the term computer-readable storage medium includes volatile and nonvolatile, removable and non-removable media implemented in any method or technology for storing information, such as computer-readable instructions, data structures, program modules or other data. The computer storage media include, but are not limited to, random access memory (RAM), read-only memory (ROM), electrically erasable programmable read-only memory (EEPROM), flash memory or other memory technologies, compact disc read-only memory (CD-ROM), digital versatile disc (DVD) or other optical disc storage, cassettes, magnetic tapes, magnetic disc storage or other magnetic storage devices, or any other media that can be configured to store desired information and can be accessed by computers. Furthermore, it is well known to those of ordinary skills in the art that communication media typically contain computer-readable instructions, data structures, program modules or other data in a modulated data signal such as a carrier wave or other transmission mechanism, and can include any information transmission media.

The invention claimed is:

1. A method for detecting a video bitstream, comprising:
   receiving a first feature value generated by a source node which transmits a video bitstream, wherein the first feature value is feature information of the video bitstream generated by the source node according to a preset rule;
   receiving a second feature value generated by another node which transmits the video bitstream, wherein the second feature value is feature information of the video bitstream generated by the another node according to the preset rule;
   determining whether the first feature value is consistent with the second feature value via comparison; and
   generating an alarm in response to a comparison result that the first feature value is inconsistent with the second feature value;
   wherein the source node or the another node generating the feature information of the video bitstream according to the preset rule comprises:
      selecting a plurality of Real-time Transport Protocol (RTP) packets of I-frame data of the video bitstream, which comprises at least one packet in ascending order of (N*20+1) and a tail packet, where N is an integer equal to or greater than 0, wherein:
         in response to the tail packet being a head packet of the at least one packet, an Message-Digest algorithm 5 (MD5) value is only generated once for the head packet or the tail packet; and
         in response to the tail packet being the (N*20+1)th RTP packet, where N is an integer greater than 0, an MD5 value is not generated separately for the tail packet; and
      performing XOR operation on a plurality of generated MD5 values, to obtain the feature information of the video bitstream.

2. The method of claim 1, wherein the feature information of the video bitstream comprises:
   an identifier of the bitstream, an RTP packet identifier of the I-frame data, and information about the RTP packet.

3. A non-transitory computer-readable storage medium, wherein the non-transitory computer-readable storage medium stores an information processing program, and the information processing program, when executed by a processor, implements the method for detecting a video bitstream of claim 2.

4. The method of claim 1, further comprising:
   skipping generating an alarm in response to a comparison result that the first feature value is consistent with the second feature value.

5. A non-transitory computer-readable storage medium, wherein the non-transitory computer-readable storage medium stores an information processing program, and the information processing program, when executed by a processor, implements the method for detecting a video bitstream of claim 4.

6. A non-transitory computer-readable storage medium, wherein the non-transitory computer-readable storage medium stores an information processing program, and the information processing program, when executed by a processor, implements the method for detecting a video bitstream of claim 1.

7. An apparatus for detecting a video bitstream, comprising:
   a first receiving unit, configured to receive a first feature value generated by a source node which transmits a video bitstream, wherein the first feature value is feature information of the video bitstream generated by the source node according to a preset rule;
   a second receiving unit, configured to receive a second feature value generated by another node which transmits the video bitstream, wherein the second feature value is feature information of the video bitstream generated by the another node according to the preset rule;
   a comparison unit, configured to determine whether the first feature value is consistent with the second feature value via comparison; and
   an alarm unit, configured to generate an alarm in response to a comparison result that the first feature value is inconsistent with the second feature value;
   wherein the source node or the another node generating the feature information of the video bitstream according to the preset rule comprises:
      selecting a plurality of Real-time Transport Protocol (RTP) packets of I-frame data of the video bitstream, which comprises at least one packet in ascending order of (N*20+1) and a tail packet, where N is an integer equal to or greater than 0, wherein:
         in response to the tail packet being a head packet of the at least one packet, an Message-Digest algorithm 5 (MD5) value is only generated once for the head packet or the tail packet; and in response to the tail packet being the (N*20+1)th RTP packet, where N is an integer greater than 0, an MD5 value is not generated separately for the tail packet; and performing XOR operation on a plurality of generated MD5 values, to obtain the feature information of the video bitstream.

8. The apparatus of claim 7, wherein the feature information of the video bitstream comprises:
an identifier of the bitstream, an RTP packet identifier of the I-frame data, and information about the RTP packet.

9. The device of claim 7, wherein the alarm unit is further configured to skip generating an alarm in response to a comparison result that the first feature value is consistent with the second feature value.

10. An apparatus for detecting a video bitstream, comprising a memory, a processor, and a computer program stored in the memory and executable by the processor, wherein the computer program, when executed by the processor, implements a method for detecting a video bitstream comprising:
receiving a first feature value generated by a source node which transmits a video bitstream, wherein the first feature value is feature information of the video bitstream generated by the source node according to a preset rule;
receiving a second feature value generated by another node which transmits the video bitstream, wherein the second feature value is feature information of the video bitstream generated by the another node according to the preset rule;
determining whether the first feature value is consistent with the second feature value via comparison; and
generating an alarm in response to a comparison result that the first feature value is inconsistent with the second feature value;
wherein the source node or the another node generating the feature information of the video bitstream according to the preset rule comprises:
selecting a plurality of Real-time Transport Protocol (RTP) packets of I-frame data of the video bitstream, which comprises at least one packet in ascending order of (N*20+1) and a tail packet, where N is an integer equal to or greater than 0, wherein:
in response to the tail packet being a head packet of the at least one packet, an Message-Digest algorithm 5 (MD5) value is only generated once for the head packet or the tail packet; and
in response to the tail packet being the (N*20+1)th RTP packet, where N is an integer greater than 0, an MD5 value is not generated separately for the tail packet; and
performing XOR operation on a plurality of generated MD5 values, to obtain the feature information of the video bitstream.

\* \* \* \* \*